(12) United States Patent
Roberts et al.

(10) Patent No.: US 7,267,372 B2
(45) Date of Patent: Sep. 11, 2007

(54) TUBE CONNECTOR

(75) Inventors: Michael T. Roberts, Thousand Oaks, CA (US); Mark T. Noel, Thousand Oaks, CA (US)

(73) Assignee: Pi-Thon Designs, Inc., Newburry Park, CA (US)

( * ) Notice: Subject to any disclaimer, the term of this patent is extended or adjusted under 35 U.S.C. 154(b) by 0 days.

(21) Appl. No.: 10/758,399

(22) Filed: Jan. 15, 2004

(65) Prior Publication Data

US 2004/0150225 A1   Aug. 5, 2004

Related U.S. Application Data

(63) Continuation-in-part of application No. 10/269,753, filed on Oct. 11, 2002, now abandoned.

(60) Provisional application No. 60/328,219, filed on Oct. 11, 2001.

(51) Int. Cl.
*F16L 33/00* (2006.01)
(52) U.S. Cl. .................. 285/249; 285/342; 285/332.1
(58) Field of Classification Search ............... 285/249, 285/342, 245, 255, 332.1
See application file for complete search history.

(56) References Cited

U.S. PATENT DOCUMENTS

| | | | | |
|---|---|---|---|---|
| 418,225 A | * | 12/1889 | Rice | 285/101 |
| 1,740,664 A | * | 12/1929 | Muehlberg | 285/238 |
| 2,288,506 A | * | 6/1942 | White | 285/341 |
| 2,423,655 A | | 7/1947 | Mars et al. | |
| 2,460,653 A | * | 2/1949 | Raybould | 285/249 |
| 2,464,416 A | * | 3/1949 | Raybould | 285/249 |
| 2,467,520 A | * | 4/1949 | Brubaker | 285/249 |
| 2,479,483 A | * | 8/1949 | Ekleberry | 439/191 |
| 2,513,115 A | | 6/1950 | Sprigg | |
| 2,585,453 A | | 2/1952 | Gallagher et al. | |
| 2,798,744 A | * | 7/1957 | Budnick et al. | 285/222.5 |
| 3,074,747 A | * | 1/1963 | Boughton | 285/342 |
| 3,368,831 A | | 2/1968 | Phillipps | |
| 3,441,297 A | | 4/1969 | Koski | |
| 3,679,239 A | * | 7/1972 | Schmitt | 285/148.22 |
| 3,685,860 A | | 8/1972 | Schmidt | |
| 3,708,186 A | | 1/1973 | Takagi et al. | |
| 3,722,925 A | | 3/1973 | Robbins | |
| 3,907,335 A | | 9/1975 | Burge et al. | |
| 3,986,736 A | | 10/1976 | Takagi et al. | |
| 4,008,911 A | | 2/1977 | Kiyooka et al. | |
| 4,303,263 A | | 12/1981 | Legris | |

(Continued)

FOREIGN PATENT DOCUMENTS

EP    0503737 A1    9/1992

OTHER PUBLICATIONS

Photo of Conduit Connector (1 Page).

*Primary Examiner*—David Bochna
(74) *Attorney, Agent, or Firm*—Christie, Parker & Hale, LLP.

(57) ABSTRACT

Tube connectors and tube connector systems are provided. An exemplary system includes a first sleeve, a second sleeve, and radially compressible ring. A tube fits radially inside of the ring and the first and second sleeves. As the first and second sleeves are coupled and brought closer together, inner surfaces of the sleeves exert a radial force onto the ring, causing the ring to radially compress onto the tube.

29 Claims, 9 Drawing Sheets

U.S. PATENT DOCUMENTS

| | | |
|---|---|---|
| 4,480,861 A | 11/1984 | Cann, Jr. |
| 5,188,401 A | 2/1993 | Staniforth |
| 5,398,980 A | 3/1995 | Hunter et al. |
| 5,449,205 A | 9/1995 | Silletti et al. |
| 6,361,084 B1 | 3/2002 | Zarbo |

* cited by examiner

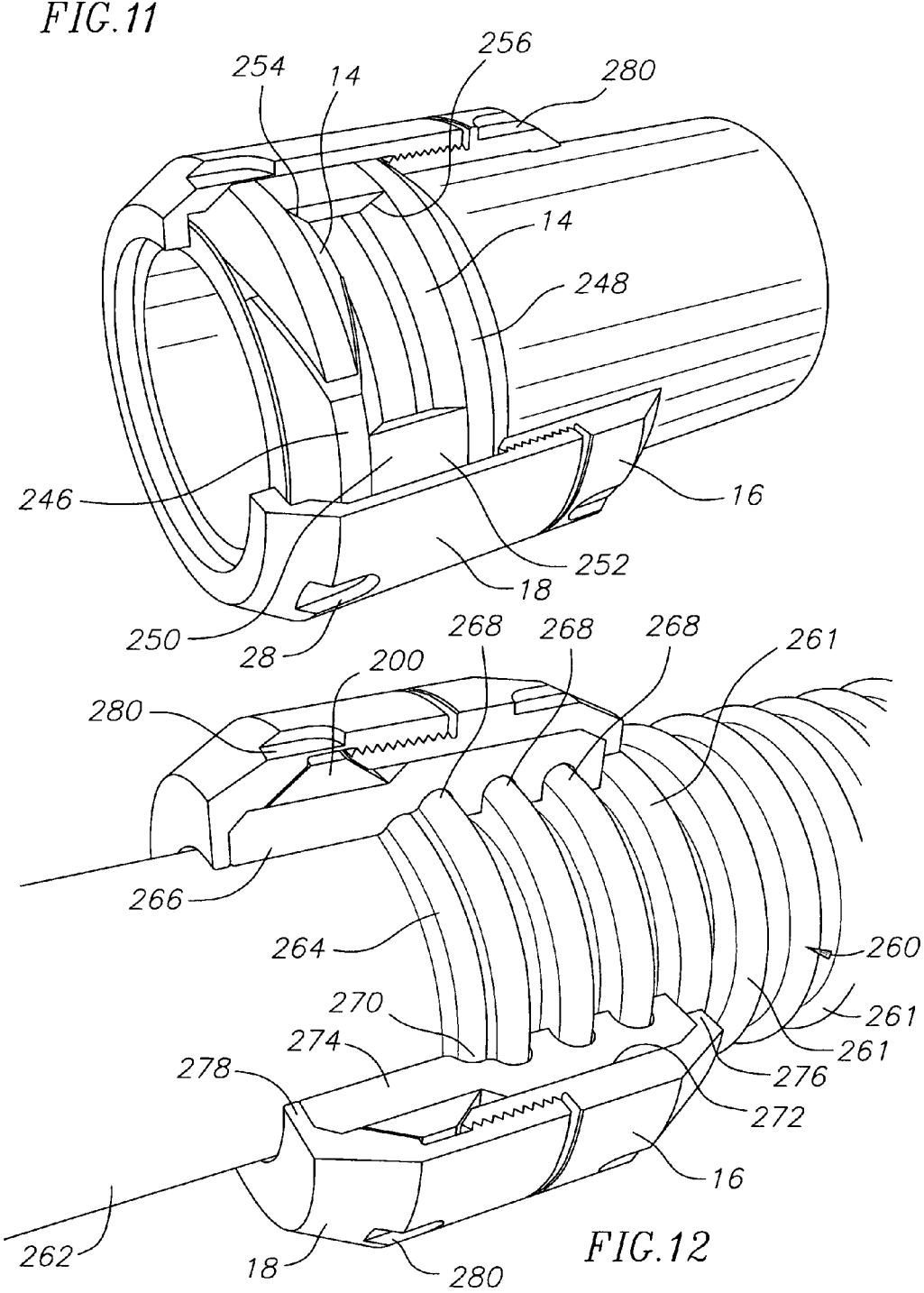

TUBE CONNECTOR

CROSS-REFERENCE TO RELATED APPLICATION(S)

This application is a continuation-in-part application of application Ser. No. 10/269,753, filed on Oct. 11, 2002, now abandoned which claims priority to U.S. provisional application No. 60/328,219, filed on Oct. 11, 2001, the contents of both of which are fully incorporated herein by reference.

FIELD OF THE INVENTION

The present invention relates to connectors and connector systems, more particularly to tube connectors and tube connector systems.

BACKGROUND OF THE INVENTION

Transport of materials such as liquids, gases, and solids frequently requires connection of tubes to fittings, pipes, or other hollow cylinders. If the connection is loose or allows leaking of the material, the transport can quickly become inefficient and the leaks can cause damage in the surrounding environment. This problem is prevalent in high pressure hose or tube, such as automobile radiator hose, connections. This problem is also especially dangerous in connections in lines or tubes used to transport hazardous or flammable liquids, such as, for example, fuel lines.

A need, therefore, exists in the art for a connector that provides a fluid tight connection. A further need exists for a connector that is simple and inexpensive to manufacture, or can be easily installed or uninstalled.

SUMMARY OF THE INVENTION

The present invention is directed to tube connectors and tube connector systems. In one embodiment a tube connector system is provided having a first sleeve having a first inside surface, and a second sleeve coupled to first sleeve and having a second inside surface that opposes the first inside surface. A split ring is located axially between the first and second inside surfaces. The split ring has a first end and a second end defining a gap there between. An outer surface portion at the first end of the split ring is tapered defining an outer ramp and an inner surface portion at the second end is tapered defining an inner ramp. A tube is surrounded by the ring, such that when the first sleeve and the second sleeve are brought together, the first and second inside surfaces exert a force against the split ring to radially compress the split ring causing the inner ramp to ride over the outer ramp. In an alternate exemplary embodiment, the inner surface portion of the split ring at the first end is tapered toward the outer surface portion of the split ring. In another exemplary embodiment, the inner ramp includes two portions angled relative to each other and the outer ramp includes two portions angled relative to each other such that when the split ring is radially compressed the two inner ramp portions ride on the two outer ramp portions.

In yet another exemplary embodiment, the split ring includes a body, a first leg extending from a first end of the body and a second leg extending from a second end of the body opposite the body first end. The split ring first end with the outer ramp is formed on a free end of the first leg. The split ring second end with inner ramp is formed on the body second end. A second gap is defined between the second leg and the first end of the body, such that the two gaps are staggered relative to each other. In another exemplary embodiment, a second outer ramp is formed at an outer surface at a free end of the second leg and a second inner ramp is formed on the body end adjacent the first leg, such that when the split ring is radially compressed the second inner ramp rides on the second outer ramp.

In a further exemplary embodiment, the split ring includes a body, a leg extending from a first end of the body and a second leg extending from a second end of the body opposite the body first end. The split ring first end with the outer ramp is formed on the first end of the body. The split ring second end with inner ramp is formed on a free end of the second leg. A second gap is defined between the first leg and the second end of the body, such that the two gaps are staggered relative to each other. In further exemplary embodiment, a second outer ramp is formed on the outer surface at the body second end and a second inner ramp is formed at inner surface at the free end of the second leg, such that when the split ring is radially compressed the second inner ramp rides on the second outer ramp.

In another exemplary embodiment a tube connector system is provided having a first sleeve having a first inside surface, and a second sleeve coupled to the first sleeve, the second sleeve having a second inside surface that opposes the first inside surface. The system further includes a first and a second tube and a resilient fitting surrounding the first and second tubes. A split ring surrounds the resilient fitting and is located radially inside of the first and second sleeves, and axially between the first and second inside surfaces, such that when the first sleeve and second sleeve are brought together, the first and second inside surfaces exert a force radially compressing the split ring, such that the split ring radially compresses the resilient fitting over at least one of said first and second tubes. In a further exemplary embodiment at least one of the tubes includes at least one rib and the resilient fitting includes at least one groove, such that the at least one rib is seated in said at least one groove.

In another exemplary embodiment a tube connector system is provided having a first sleeve having a first inside surface and a second sleeve coupled to the first sleeve and sleeve having a second inside surface that opposes the first inside surface. A split ring is located radially inside of the first and second sleeves, and axially between the first and second inside surfaces. The split ring includes a body having a first end and a second end, a first leg extending from the body first end, and a second leg extending from the body second end. A first gap is defined between the first leg and the body second end. A second gap is defined between the second leg and the body first end. The side of each leg adjacent the side of the other leg is tapered whereby the width of each leg decreases in a direction away from its corresponding body end. A tube surrounded by the split ring, wherein when the first sleeve and second sleeve are brought together, the first and second inside surfaces exert a force radially compressing the split ring for clamping on the tube.

In yet a further exemplary embodiment, a tube connector system is provided having a first sleeve having a first inside surface, and a second sleeve coupled to the first sleeve, where the second sleeve has a second inside surface that opposes the first inside surface. A groove is formed on the second sleeve. A split ring seated in the groove and located axially between the first and second inside surfaces. A tube is surrounded by the split ring, such that when the first sleeve and second sleeve are brought together, the first and second inside surfaces exert a force radially compressing the ring, and the split clamps on the tube.

In a further exemplary embodiment, a tube connector system is provided having a first sleeve having a first inside surface, and a second sleeve coupled to the first sleeve, the second sleeve having a second inside surface that opposes the first inside surface. A first split ring is located axially between the first and second inside surfaces. A second split ring is located axially between the first and second inside surfaces. A spacer located axially between the first and second the split ring. A tube surrounded by the two split rings, such that when the first sleeve and second sleeve are brought together, the first and second inside surfaces and the spacer exert a force radially compressing both split rings.

BRIEF DESCRIPTION OF THE DRAWINGS

One or more of these features and advantages will be better understood by reference to the following detailed description when considered in conjunction with the accompanying drawings wherein:

FIG. 11 is a perspective view with a partial cut-away of another exemplary embodiment tube connector of the present invention incorporating a spacer; and FIG. 12 is a perspective view with a partial cut-away of yet another exemplary embodiment tube connector of the present invention incorporating a resilient fitting.

DETAILED DESCRIPTION OF THE INVENTION

Figure 1:
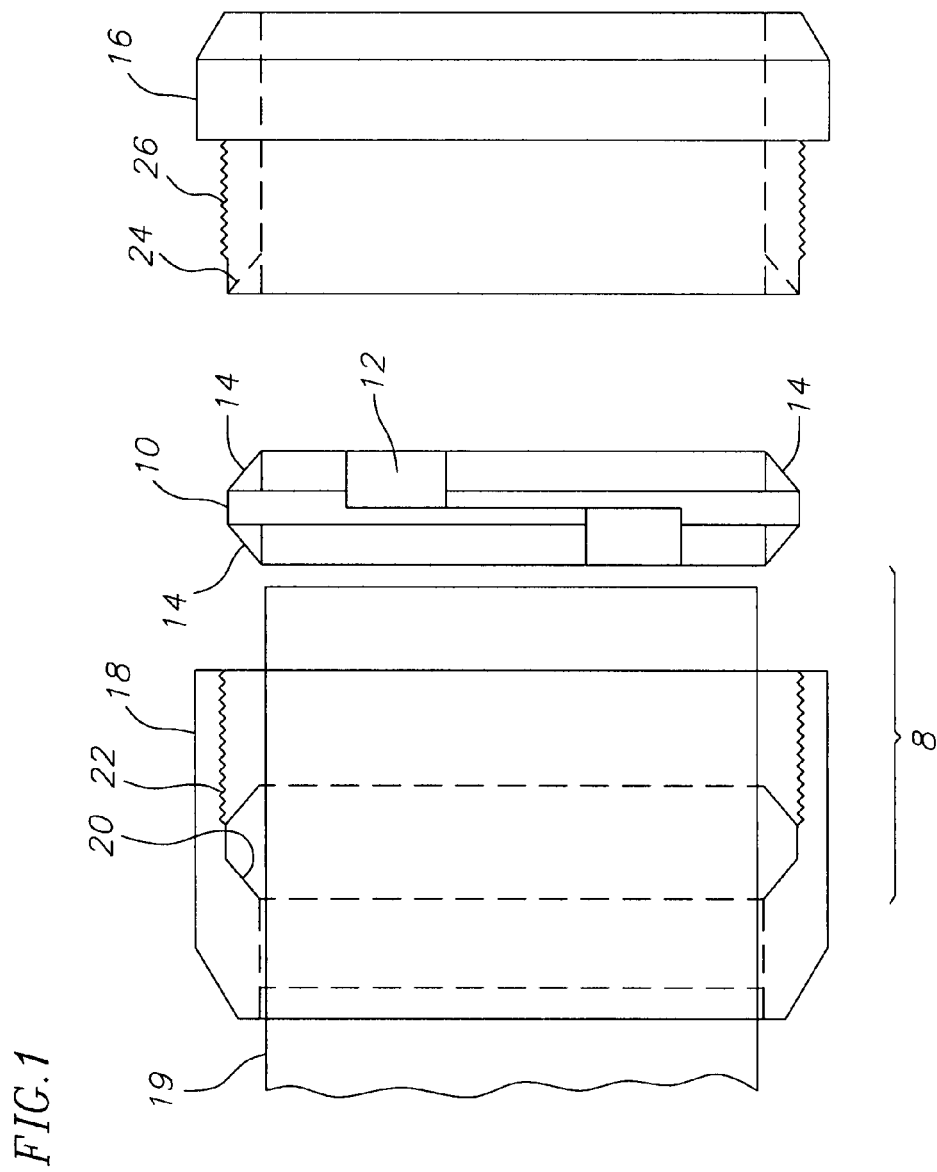
FIG. 1 is a partial cross-sectional view of a tube connector according to one exemplary embodiment of the invention.

The present invention is directed to a tube connecting system and apparatus. In an exemplary embodiment shown in FIG. 1, the system includes a split ring 10 having tapered opposed outer surfaces 14, a first sleeve 16, a second sleeve 18, and a radially compressible tube 19. The sleeves 16, 18 may be manufactured from any rigid material, such as, for example, aluminum, Teflon™, Delrin™, or nylon. In the exemplary embodiment the split ring has staggered gaps 12 defining the split and is made from a metallic material such as aluminum. In an alternate exemplary embodiment, the split ring has a single gap across the width of the ring.

The ring 10 surrounds (i.e., is fitted around) the tube 19 at an overlapping area 8 where a cylinder (not shown) can be inserted into the tube 19. The ring 10 sits within the second sleeve 18 in a sloped seat 20 formed on an inner surface of the second sleeve 18 adjacent to threads 22 formed on the second sleeve 18 inner surface. The first sleeve 16 has a sloped seat 24 formed on an inner surface of the first sleeve 20 adjacent to threads 26 formed on an outer surface of the first sleeve 16.

When the sleeves 16, 18 are threaded together, the sloped seats 20 and 24 are brought closer. The ring 10 is sandwiched between the sloped seats 20, 24, and the seats 20, 24 push against the tapered outer surfaces 14 of the ring 10 as the sleeves 16, 18 are threaded closer together, compressing the ring 10. In one embodiment, the slopes of the seats 20, 24 are similar or identical to the slope of their corresponding tapered ring surface 14, so that the ring surfaces 14 smoothly slide along the sloped seats 20, 24 as the two sleeves are threaded together. In one embodiment, the seats 20, 24 and ring surface 14 are inclined at an angle of around 60 degrees from the horizontal. Applicants have discovered that an incline of 60 degrees provides for smooth compressing operation of the ring as the sleeves are threaded together.

As the staggered gaps 12 of the ring 10 begin to close when the sleeves are threaded together, the ring 10 decreases in diameter, thereby clamping the tube against any member that is inserted in the tube as for example a cylinder (not shown) providing a tight high pressure seal against the cylinder.

Although the embodiment shown in FIG. 1 includes a ring 10 with tapered opposed outer surfaces 14, the outer surface of the ring 10 can also be flat, rounded, or any surface that would allow the force from the sloped seats 20, 24 to radially compress the ring 10 when the sleeves 16, 18 are brought closer together. Moreover, the seats 20, 24 in other exemplary embodiments may not be sloped. In such case, it will be preferred to use a split ring having tapered opposed outer surfaces. Although the sleeves 14, 16 are shown in FIG. 1 as threaded together, any other means of connecting the first and second sleeves 14, 16 may also be used.

Figure 2:
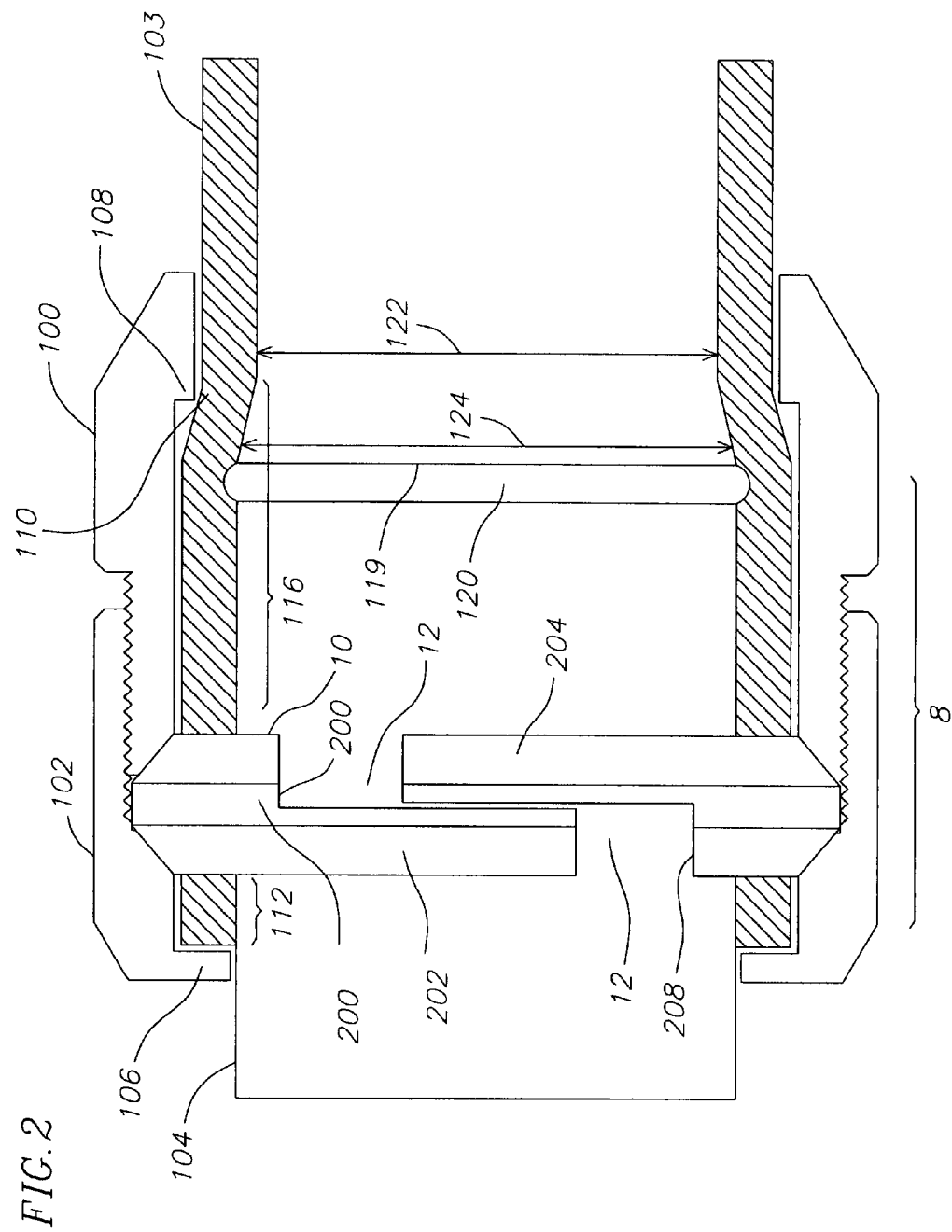
FIG. 2 is a partial cross-sectional view of a tube connector system according to another exemplary embodiment of the invention.

Referring to FIG. 2, an exemplary embodiment of a system according to the invention includes a first sleeve 100, a second sleeve 102, a split sealing ring 10, a radially and axially compressible tube 103 and a cylinder 104. The second sleeve 102 includes a contact surface 106 for gripping the tube 103. In this embodiment, the contact surface 106 projects radially inward toward the cylinder 104 and allows for the system to be self-positioning over the end of the tube 103. Although the embodiment shown in FIG. 2 shows the contact surface 106 as a ledge which partially encloses an end of the tube 103, any contact surface 106 capable of gripping a portion of the tube 103 can be used.

The first sleeve 100 also includes a contact surface 108 for contacting the tube 103. Although the contact surface 108 is shown as a ledge 108 projecting inward to radially compress the tube 103 at a point 110 where the tube 103 does not overlap the cylinder 104, any contact surface 108 capable of gripping the tube 103 can be used on or off of the overlapping portion 8.

Like the embodiment shown in FIG. 1, as the sleeves 100, 102 are threaded closer together, the ring 10 will radially compress onto the tube 103 and the tube 103 will radially compress onto the cylinder 104. Additionally, since the tube 103 in FIG. 2 is axially compressible, the contact surfaces axially compress the tube against the tube portion clamped by the ring. Consequently, the axially compressed tube portions expand forming further seals against the outer surface of the cylinder. For example, the end section 112 of the tube between the contact surface 106 and the ring 10 will axially compress and expand forming a seal against the cylinder outer surface. Likewise, the area 116 of the tube between the contact surface 108 and the ring 10 will axially compress and radially expand due to the friction or gripping of the contact surface 108, forming a seal against the cylinder outer surface. The effectiveness of this latter seal can be increased by projecting the contact surface 108 radially inward, as shown in FIG. 2. This projecting contact surface 108 also radially compresses the tube to a diameter 122 smaller than the diameter 124 of an end 119 of the cylinder 104. In another exemplary embodiment, an annular lip 120 is formed projecting radially from the cylinder 104 to further axially and radially compresses the tube. Thereby, this lip 120 can further increase the effectiveness of the seal. Consequently, with the exemplary embodiment shown in FIG. 2, further seals are formed between the tube and the outer surface of the cylinder in addition to the seal formed between the tube and the cylinder when clamped by the ring. Applicants have discovered that with the exemplary embodiment connector shown in FIG. 2, they can form high pressure tube connections that can withstand a gas or liquid, i.e. a fluid, pressure of over 100 psi.

Although the embodiment shown in FIG. 2 shows contact areas 106, 108 on both the first and second sleeves 100, 102, it is within the scope of the invention to include only a single contact area on either the first or the second sleeve 100, 102. Likewise, the structure described in relation to the first sleeve 100 can be applied to the second sleeve 102 and vice versa.

Another embodiment (not shown) also includes a second tube connector system located on the other end of the tube for connecting a cylinder to each end of the tube. This embodiment additionally includes a third sleeve coupled to a fourth sleeve, the sleeves radially surrounding a second ring. The second ring sits axially between a third and a fourth sloped inside surfaces on the third and fourth sleeves, respectively. The second ring radially surrounds the tube at the opposite end as the first ring. The second ring surrounds a second cylinder and radially compresses the tube around the second cylinder when the third and fourth sleeves are brought together. With this embodiment, the compressible tube is used to couple two cylinders.

Figure 3:
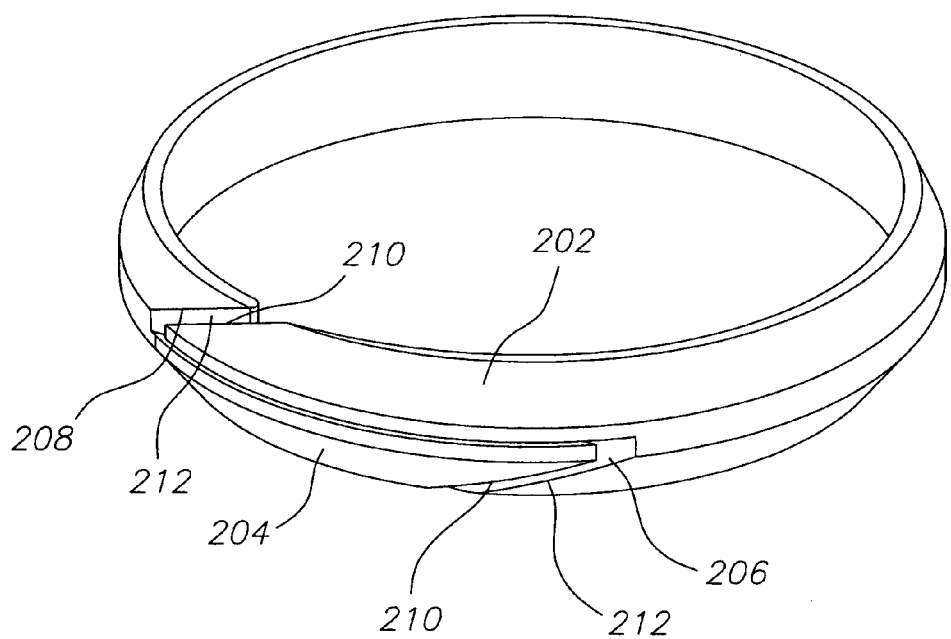
FIG. 3 is a perspective view of an exemplary embodiment split ring for use with an exemplary embodiment tube connector of the present invention.

In one exemplary embodiment, as for example shown in FIG. 2, a split ring has a body portion 200 and two leg portions 202, 204 extending from opposite ends 206, 208, respectively of the body portion 200. Each of the staggered gaps 12 is defined between an end of a leg portion and an end of a body portion. In this regard as the ring is compressed each leg portion moves closer to a body opposite end portion reducing the gap. In an effort to get more compressive stresses on the tube, the inner surface of an end portion of the leg portion 202 is tapered outward toward the gap providing an inner ramp 210 allowing the leg portion 202 to ride over the end 208 of the body portion opposite the leg portion 202 further compressing the ring as for example shown in FIG. 3. To assist the leg portion 202 inner ramp 210 in riding over the body portion end 208, the outer surface of the end portion 208 may also be tapered providing a ramp 212, as for example shown in FIG. 3. Similarly, in an exemplary embodiment, an inner ramp is formed on the inner surface at an end of the leg portion 204 and an outer ramp is formed on the outer surface at the end 206 of the body portion opposite the leg portion 204. In an alternate exemplary embodiment, not shown, outer ramps may be formed on the leg portions and corresponding inner ramps may be formed on the end portions of the body portion opposite the leg portions.

Figure 4:
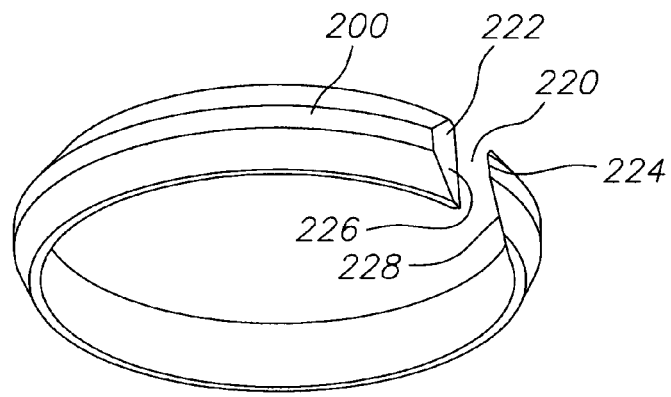
FIG. 4 is a perspective view of an exemplary embodiment split ring for use with an exemplary embodiment tube connector of the present invention.

In an alternate exemplary embodiment, the ring does not have any leg portions but rather only a body portion 200, as for example as shown in FIG. 4. With this exemplary embodiment, the ring is a split ring defining a single gap 220 and not two staggered gaps. Consequently, this exemplary embodiment split ring has two ends 222, 224, respectively, defining the gap 220 there between. In an exemplary embodiment, an outer end portion of the ring at the end 222 is tapered toward the gap forming an outer ramp 226 so that when the ring is compressessed, the ramp 226 slides underneath the other end 224 of the ring adjacent to gap. To assist in the sliding of one end portion of the ring underneath the other, an inner surface portion at the other end 224 of the ring is also be tapered providing an inner ramp 228.

Figure 5:
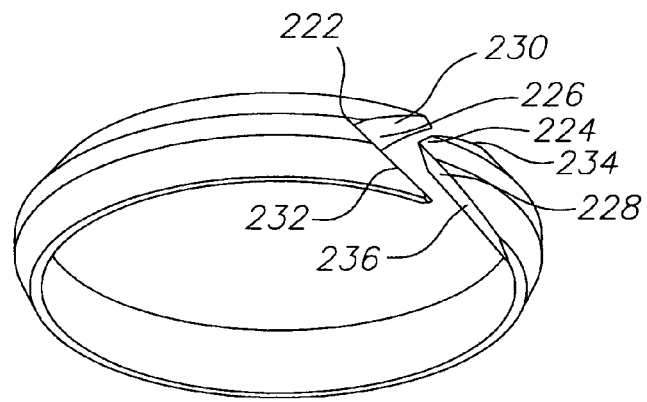
FIG. 5 is a perspective view of an exemplary embodiment split ring for use with an exemplary embodiment tube connector of the present invention.
Figure 6:
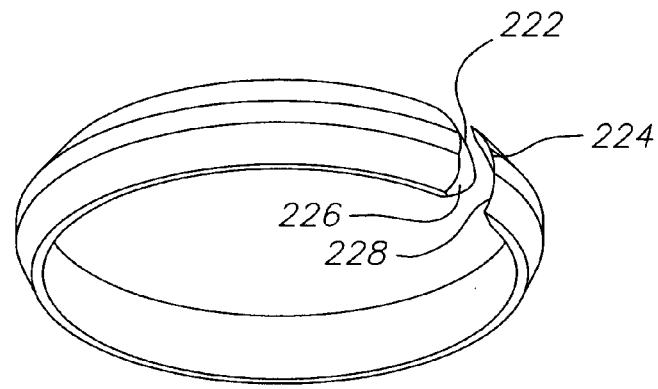
FIG. 6 is a perspective view of an exemplary embodiment split ring for use with an exemplary embodiment tube connector of the present invention.

In another exemplary embodiment shown in FIG. 5, the end 222 is chevron-shaped and the outer ramp 226 includes two surfaces 230, 232, which are angled relative to each other. The other end inner ramp 228 includes two surfaces 234, 236 angled relative to each other and correspond to the outer ramp surfaces 230, 232. In yet a further exemplary embodiment as shown in FIG. 6, the outer ramp 226 and the inner ramp 228 are both curved along the ring axial direction.

Figure 7:
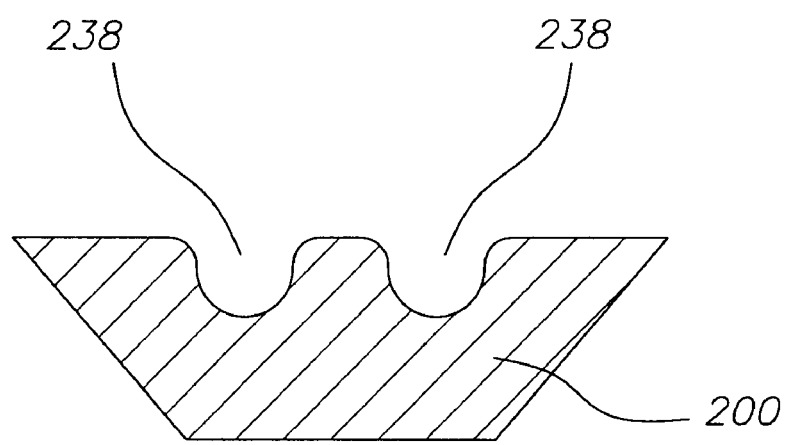
FIG. 7 is a cross-sectional view of an exemplary embodiment split ring having annular grooves.

With any of the aforementioned exemplary embodiments one or multiple grooves 238, as for example annular grooves 238 shown in FIG. 7 may be formed on inner surface of the ring 200. The groove(s) may span the entire split ring inner circumference or only a portion of the inner circumference. The groove(s) 238 allow for the expansion of a flexible tube being compressed by the ring into such groove(s). Consequently, a tighter clamp is provided between the split ring and the outer surface of the flexible tube.

Figure 8:
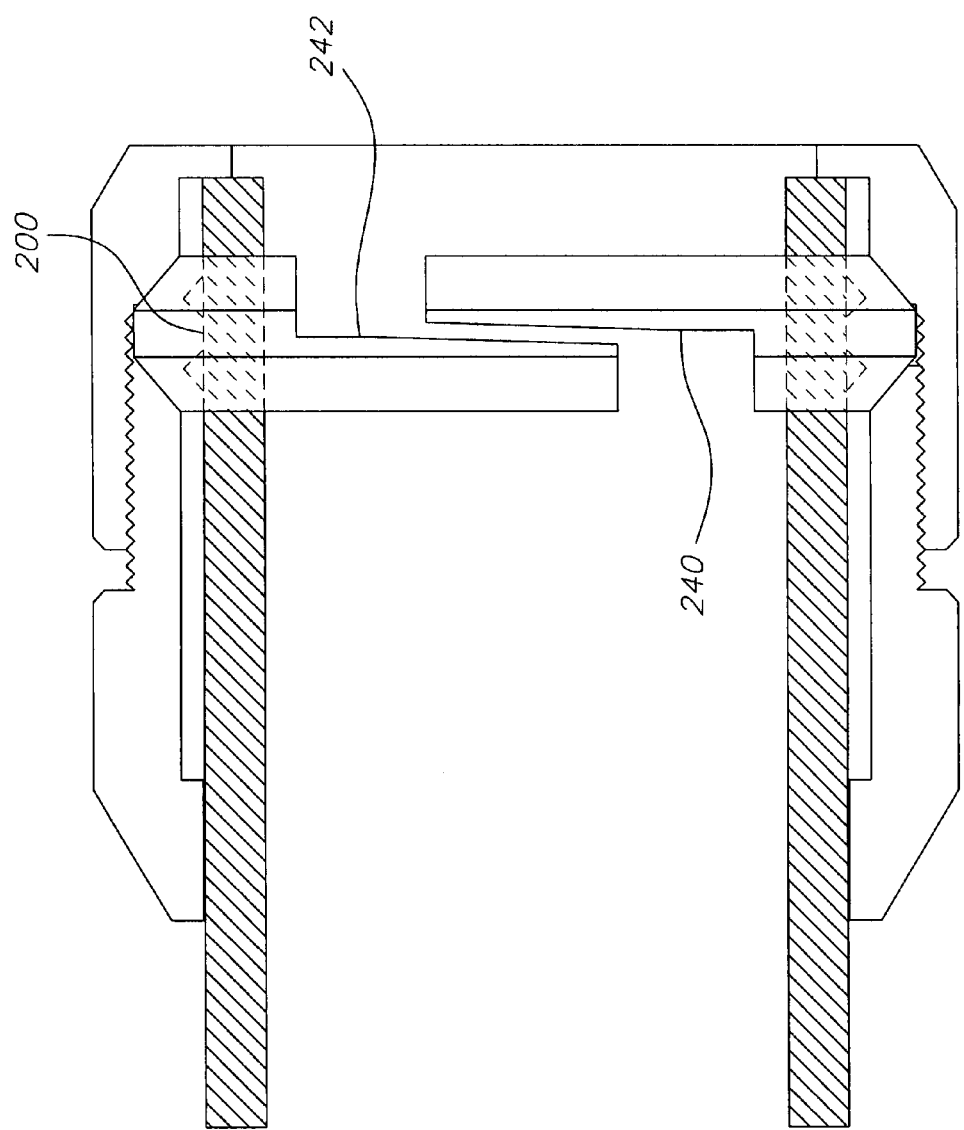
FIG. 8 is a partial cross-sectional view of another exemplary embodiment tube connector system of the present invention.

Applicants have discovered when using a split ring having two leg portions and two staggered gaps, the leg portions tend to separate during compression of the split ring, consequently increasing the width of the split ring at the location of the leg portions. This separation weakens the clamping force provided by the split ring. Applicants have discovered that they can overcome this problem by tapering the length of the leg portions so as that they narrow in width as they extend away from the body portion. In an exemplary embodiment, the tapering is accomplished by tapering the side 240, 242 of each leg portion closest to the other leg portion as for example shown in FIG. 8. In this regard, as the split ring is compressed the tapered sides 240, 242 tend to ride against each other minimizing the increase in the width of the ring 200 at the location of the leg portions during compression and thus, preserving the integrity of the clamping force provided by the ring.

Figure 9:
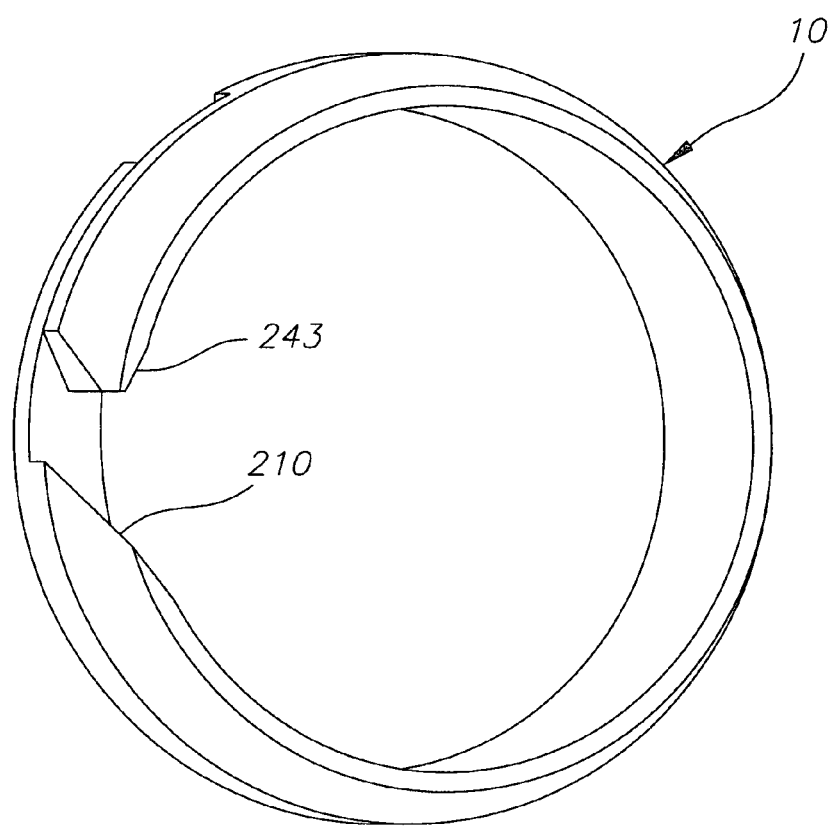
FIG. 9 is an end view of another exemplary embodiment split ring.

Applicants have also discovered that during compression of a split ring, especially over rubber tubing, the portion of the rubber tubing between the free ends of the split ring, i.e., the portion of the tubing under the split ring gap, gets pinched by the split ring free end non-tapered inner surface, preventing the appropriate compression of the ring. Applicants have discovered that they can alleviate this problem by tapering a lower portion 243 of the ring end that was not already tapered, as for example shown in FIG. 9.

Figure 10:
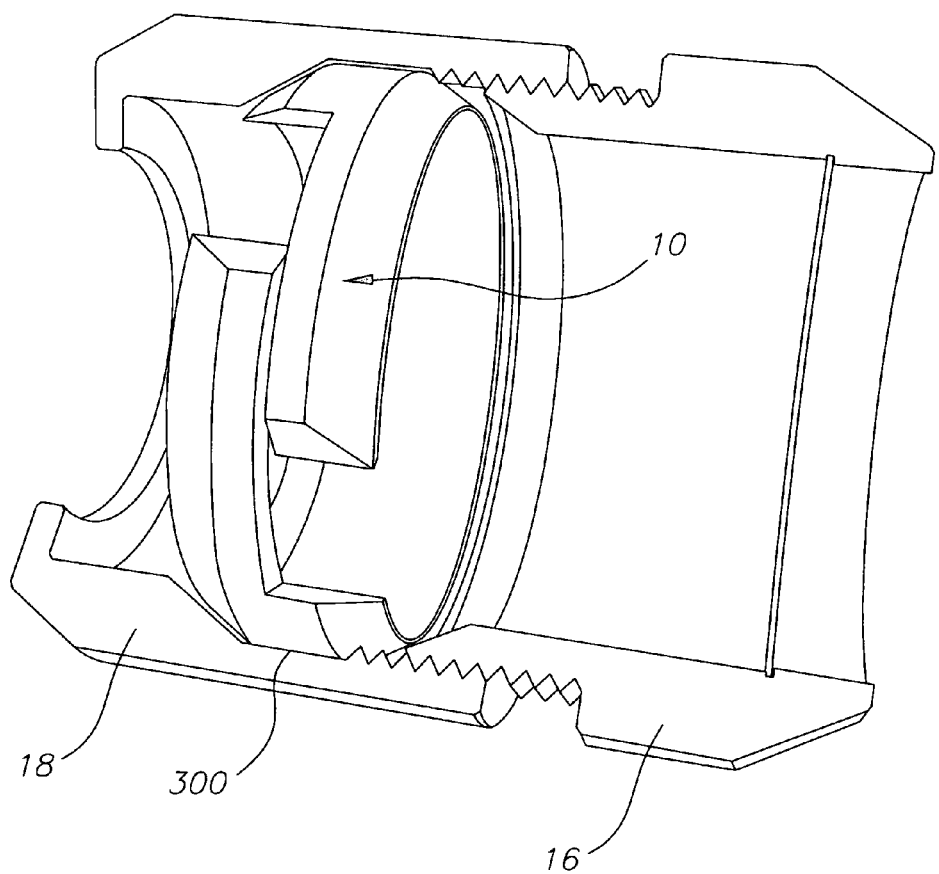
FIG. 10 is a partial cross-sectional view of yet another exemplary embodiment tube connector of the present invention.

In alternate exemplary embodiments, a groove 300 may be formed on the inner surface of the second or female sleeve 18 to accommodate the ring as for example shown in FIG. 10. In such case, the ring will need to be compressed in order to be installed in the groove in the female sleeve. This arrangements is especially advantageous when using when using smaller diameter sleeves for clamping smaller diameter tubes, as for example tubes having outer surface diameters less than 1 inch.

In a further exemplary embodiment, more than one compression ring may be used to form a tube connection. For example, two split rings 246, 248 may be used which are separated by a spacer 250 such as a spacer ring 252 shown, with a section removed for clarity, in FIG. 11. The spacer ring may have various cross-sectional shapes. For example, the space ring may be trapezoidal in cross-section having two tapering edge or outer surfaces 254, 256, which taper away from each other in a radially outward direction, for exerting a force against the tapered outer surfaces 14 of the two adjacent compression rings 246, 250 as for example shown in FIG. 11. In yet a further exemplary embodiment, the spacer ring may have an oval cross-sectional shape. Moreover, the spacer may be a complete ring or in another exemplary embodiment it may be a split ring. In a further exemplary embodiment, the spacer may comprise one or more separate annular sections The two split rings with the spacer are used in the same fashion as a single split ring. For example, in one exemplary embodiment, as the two sleeves are threaded together, the sloped seat of one sleeve contacts the tapered outer surface of one split ring and the sloped seat of the other sleeve contacts the tapered outer surface of the other split ring, whereby the spacer sandwiched between the split rings and the sleeves ride on the upper surface of the split ring causing both of the split rings to compress and clamp against the tubing or hose being clamped. In this regard the hose or tube being clamped is clamped at two distinct locations. Applicants have discovered by clamping at more than one location, greater pressure may be sustained by the clamped joint.

Any of the aforementioned embodiment connectors may be used to couple together tubes at least one of which has a non-regular outer surfaces as for example, a corrugated outer surface. For example, an aforementioned embodiment connector may be used to couple a hose having a corrugated outer surface as for example a corrugated radiator hose 260 having a plurality of spaced apart annular ribs 261 to a hose 262 having a lip 264 as for example shown in FIG. 12. In such case, a resilient fitting 266 is used to couple the two hoses to the connector. The two hoses to be coupled or abutted against each other. In the exemplary embodiment shown in FIG. 12, the resilient fitting is a silicon fitting that is fitted over the ribs 261 of the radiator hose 260 and the lip 264 of the hose 262. In the exemplary embodiment shown in FIG. 12 the resilient fitting 266 has three inner annular grooves 268 which mate with three ribs of the corrugated hose. In addition, the fitting has a fourth annular groove 270 that accommodates the lip 264. The outer surface of the resilient fitting is stepped such that the fitting has a larger outer diameter section 272 and a smaller outer diameter section 274. The three inner annular grooves 268 mating with the ribs are formed on the inner surface of the larger outer diameter section.

The split ring 200 is fitted over the fitting outer surface smaller diameter section 274. In the exemplary embodiment shown in FIG. 12, the first and second sleeves are formed with lips 276 and 278, respectively to retain the resilient fitting. As the two sleeves are coupled together, they cause the split ring to compress against the smaller outer diameter section of the fitting and to clamp against the hose 262 and lip 264. At the same time the sleeves retain the larger outer diameter section engaged to the ribs of the corrugated hose such that the hose 262 and the corrugated hose 260 are maintained coupled together.

In exemplary embodiments, any of the aforementioned connector sleeves are formed with annularly spaced apart depressions 280 for accommodating a spanner wrench. In this regard, a spanner wrench may be used to thread one sleeve to the other sleeve. Spanner wrenches can be used in tight quarters. Consequently, by allowing for the use of spanner wrenches to tighten and looser the sleeves, the connectors of the present invention may be used is tight locations as for example in an automobile engine compartment.

As can be seen, the connector and system of the present invention provide for high pressure connections that are easy to form and re-form if necessary. The simplicity of mechanical structure and relatively few number of parts also decrease production costs and increase efficiency.

Although specific embodiments are disclosed herein, it is expected that persons skilled in the art can and will design alternative embodiments of the invention that are within the scope of the following claims either literally or under the Doctrine of Equivalents.

The invention claimed is:

1. A tube connector system comprising:
a first sleeve having a first inside surface;
a second sleeve coupled to first sleeve, the second sleeve having a second inside surface that opposes the first inside surface;
a split ring located axially between the first and second inside surfaces, the split ring comprising a first end and a second end wherein a gap is defined between the two ends, and wherein an outer surface portion at the first end is tapered defining an outer ramp and wherein an inner surface portion at the second end is tapered defining an inner ramp; and
a tube surrounded by the ring, wherein when the first sleeve and the second sleeve are brought together, the first and second inside surfaces exert a force radially compressing the split ring causing the inner ramp to ride over the outer ramp, wherein the split ring comprises a body, a leg extending from a first end of the body and a second leg extending from a second end of the body opposite the body first end, wherein the split ring first end with the outer ramp is formed on the first end of the body, and wherein the split ring second end with inner ramp is formed on a free end of the second leg, and wherein a second gap is defined between the first leg and the second end of the body, wherein the two gaps are staggered relative to each other, and wherein a second outer ramp is formed on the outer surface at the body second end and wherein a second inner ramp is formed at inner surface at the free end of the second leg and wherein when the split ring is radially compressed, the second inner ramp rides on the second outer ramp.

2. A system as recited in claim 1 wherein the inner surface at the body second end opposite the outer ramp is tapered toward the outer ramp decreasing the thickness of the body second end in a direction toward the gap adjacent the body second end.

3. A system as recited in claim 2 wherein the inner surface at the body first end opposite the second outer ramp is tapered toward the second outer ramp decreasing the thickness of the body first end in a direction toward the gap adjacent the body first end.

4. A tube connector system comprising:
a first sleeve having a first inside surface;

a second sleeve coupled to first sleeve, the second sleeve having a second inside surface that opposes the first inside surface;

a split ring located axially between the first and second inside surfaces, the split ring comprising a first end and a second end wherein a gap is defined between the two ends, and wherein an outer surface portion at the first end is tapered defining an outer ramp and wherein an inner surface portion at the second end is tapered defining an inner ramp; and a tube surrounded by the ring, wherein when the first sleeve and the second sleeve are brought together, the first and second inside surfaces exert a force radially compressing the split ring causing the inner ramp to ride over the outer ramp, wherein the split ring comprises a body, a leg extending from a first end of the body and a second leg extending from a second end of the body opposite the body first end, wherein the split ring first end with the outer ramp is formed on the first end of the body, and wherein the split ring second end with inner ramp is formed on a free end of the second leg, and wherein a second gap is defined between the first leg and the second end of the body, wherein the two gaps are staggered relative to each other, and wherein the side of each leg adjacent the side of the other leg is tapered whereby the width of each leg decreases in a direction away from its corresponding body end.

5. A system as recited in claim 4 wherein a groove is formed on an inner surface of one of said first and second sleeves and wherein the split ring is seated within said groove.

6. A tube connector system comprising:
a first sleeve having a first inside surface;
a second sleeve coupled to first sleeve, the second sleeve having a second inside surface that opposes the first inside surface;
a split ring located axially between the first and second inside surfaces, the split ring comprising a first end and a second end wherein a gap is defined between the two ends, and wherein an outer surface portion at the first end is tapered defining an outer ramp and wherein an inner surface portion at the second end is tapered defining an inner ramp;
a tube surrounded by the ring, wherein when the first sleeve and the second sleeve are brought together, the first and second inside surfaces exert a force radially compressing the split ring causing the inner ramp to ride over the outer ramp;
a resilient fitting surrounding the tube, wherein the split ring surrounds the resilient fitting, wherein when radially compressed, the split ring clamps on the resilient fitting; and
a second wherein resilient fitting surrounds the first and second tubes.

7. A system as recited in claim 6 wherein the second tube comprises a rib, and wherein the resilient fitting comprises a groove, wherein the rib is fitted in the groove.

8. A system as recited in claim 7 wherein the tube surrounded by the split ring comprises a rib and wherein the resilient fitting comprises another groove wherein the rib of the tube surrounded by the split ring is fitted in said another groove.

9. A system as recited in claim 6 further comprising:
a second split ring located axially between the first and second inside surfaces; and a spacer located axially between the two split rings, wherein when the first and second sleeves are brought together the first and second inside surfaces and the spacer exert a force radially compressing both split rings.

10. A system as recited in claim 6 wherein one of the sleeves comprises a plurality of grooves on its outer surface for accommodating a spanner wrench.

11. A system as recited in claim 6 wherein the resilient fitting is made from silicone.

12. A tube connector system comprising:
a first sleeve having a first inside surface;
a second sleeve coupled to the first sleeve, the second sleeve having a second inside surface that opposes the first inside surface;
first tube;
a second tube;
a resilient fitting surrounding the first and second tubes; and
a split ring surrounding the resilient fitting and located radially inside of the first and second sleeves, and axially between the first and second inside surfaces, wherein when the first sleeve and second sleeve are brought together, the first and second inside surfaces exert a force radially compressing the split ring, and the split ring radially compresses the resilient fitting over at least one of said first and second tubes, wherein at least one of the tubes comprises at least one rib and wherein the resilient fitting comprises at least one groove, wherein said at least one rib is seated in said at least one groove.

13. A system as recited in claim 12 wherein the first inside surface is sloped, and wherein the second inside surface is sloped in a direction opposite the first inside surface.

14. A system as recited in claim 13 wherein the split ring comprises an outer surface comprising tapered opposed outer surfaces whereby the split ring has a generally trapezoidal cross-section, and wherein the first sloped inside surface provides a force against a first tapered opposed outer surface and wherein the second sloped inside surface provides a force against the other of said opposed outer surfaces.

15. A system as recited in claim 12 wherein the split ring comprises an outer surface comprising tapered opposed outer surfaces whereby the split ring has a generally trapezoidal cross-section.

16. A system as recited in claim 12 wherein the resilient fitting comprises silicone.

17. A tube connector system comprising:
a first sleeve having a first inside surface;
a second sleeve coupled to the first sleeve, the second sleeve having a second inside surface that opposes the first inside surface;
first tube;
a second tube;
a resilient fitting surrounding the first and second tubes; and
a split ring surrounding the resilient fitting and located radially inside of the first and second sleeves, and axially between the first and second inside surfaces, wherein when the first sleeve and second sleeve are brought together, the first and second inside surfaces exert a force radially compressing the split ring, and the split ring radially compresses the resilient fitting over at least one of said first and second tubes, wherein the split ring radially compresses the resilient fitting against the first tube, wherein the second tube comprises a plurality of spaced apart annular ribs, and wherein the resilient fitting comprises a plurality of grooves, wherein each of said plurality of annular ribs is seated in a separate one of said plurality of grooves.

18. A system as recited in claim 17 wherein the first tube comprises a rib and wherein the resilient fitting comprises another groove, wherein said first tube rib is seated in said another groove.

19. A tube connector system comprising:
a first sleeve having a first inside surface;
a second sleeve coupled to the first sleeve, the second sleeve having a second inside surface that opposes the first inside surface;
a first tube;
a second tube;
a resilient fitting surrounding the first and second tubes; and
a split ring surrounding the resilient fitting and located radially inside of the first and second sleeves, and axially between the first and second inside surfaces, wherein when the first sleeve and second sleeve are brought together, the first and second inside surfaces exert a force radially compressing the split ring, and the split ring radially compresses the resilient fitting over at least one of said first and second tubes, wherein each sleeve comprises a lip, wherein the resilient fitting is located between the two lips and wherein the lips axially retain the resilient fitting.

20. A system as recited in claim 19 wherein the split ring comprises two ends, wherein an inner surface portion of the split ring at each end is tapered toward the outer surface of the split ring.

21. A system as recited in claim 19 further comprising:
a second split ring located axially between the first and second inside surfaces and surrounding the resilient fitting; and
a spacer located axially between the two split rings, wherein when the first and second sleeves are brought together the first and second inside surfaces and the spacer exert a force radially compressing both split rings.

22. A system as recited in claim 19 wherein one of the sleeves comprises a plurality of grooves on its outer surface for accommodating a spanner wrench.

23. A tube connector system comprising:
a first sleeve having a first inside surface;
a second sleeve coupled to the first sleeve, the second sleeve having a second inside surface that opposes the first inside surface;
a split ring located radially inside of the first and second sleeves, and axially between the first and second inside surfaces, wherein the split ring comprises,
a body having a first end and a second end,
a first leg extending from the body first end, and
a second leg extending from the body second end, wherein a first gap is defined between the first leg and the body second end, wherein a second gap is defined between the second leg and the body first end, wherein the two gaps are staggered, and wherein the side of each leg adjacent the side of the other leg is tapered whereby the width of each leg decreases in a direction away from its corresponding body end; and
a tube surrounded by the split ring, wherein when the first sleeve and second sleeve are brought together, the first and second inside surfaces exert a force radially compressing the split ring for clamping on the tube.

24. A system as recited in claim 23 wherein the first inside surface is sloped, and wherein the second inside surface is sloped in a direction opposite the first inside surface.

25. A system as recited in claim 24 wherein the split ring comprises an outer surface comprising tapered opposed outer surfaces whereby the split ring has a generally trapezoidal cross-section, and wherein the first sloped inside surface provides a force against a first tapered opposed outer surface and wherein the second sloped inside surface provides a force against the other of said opposed outer surfaces.

26. A system as recited in claim 23 wherein the split ring comprises an outer surface comprising tapered opposed outer surfaces whereby the split ring has a generally trapezoidal cross-section.

27. A system as recited in claim 23 wherein the inner surface at an end of each leg is tapered toward the upper surface in a direction toward a free end of the leg.

28. A system as recited in claim 23 further comprising:
a second split ring located axially between the first and second inside surfaces; and
a spacer located axially between the two split rings, wherein when the first and second sleeves are brought together the first and second inside surfaces and the spacer exert a force radially compressing both split rings.

29. A system as recited in claim 23 wherein one of the sleeves comprises a plurality of grooves on its outer surface for accommodating a spanner wrench.

* * * * *